United States Patent
Ma

(10) Patent No.: US 7,916,748 B2
(45) Date of Patent: Mar. 29, 2011

(54) METHOD AND SYSTEM FOR INITIALIZATION CONFIGURATION OF MANAGED DEVICE

(75) Inventor: Yuzhi Ma, Shenzhen (CN)

(73) Assignee: Huawei Technologies Co., Ltd., Shenzhen (CH)

( * ) Notice: Subject to any disclaimer, the term of this patent is extended or adjusted under 35 U.S.C. 154(b) by 316 days.

(21) Appl. No.: 12/013,051

(22) Filed: Jan. 11, 2008

(65) Prior Publication Data

US 2008/0107131 A1 May 8, 2008

Related U.S. Application Data

(63) Continuation of application No. PCT/CN2006/001295, filed on Jun. 13, 2006.

(30) Foreign Application Priority Data

Jul. 28, 2005 (CN) .......................... 2005 1 0087292

(51) Int. Cl.
H04L 12/42 (2006.01)
H04L 12/56 (2006.01)
(52) U.S. Cl. ..................... 370/457; 370/453; 370/419
(58) Field of Classification Search .......... 370/449–457; 709/220–222
See application file for complete search history.

(56) References Cited

U.S. PATENT DOCUMENTS

| 6,061,739 | A  | * | 5/2000 | Reed et al. ..................... 709/245 |
| 6,658,498 | B1 |   | 12/2003 | Carney et al. |
| 6,795,846 | B1 |   | 9/2004 | Merriam |
| 2003/0101243 | A1 |   | 5/2003 | Donahue et al. |
| 2003/0115298 | A1 | * | 6/2003 | Baker ........................... 709/220 |
| 2003/0177210 | A1 | * | 9/2003 | Stringham ..................... 709/222 |
| 2004/0014475 | A1 | * | 1/2004 | Saito et al. ..................... 455/445 |
| 2007/0016658 | A1 | * | 1/2007 | Moineau et al. ............... 709/219 |

FOREIGN PATENT DOCUMENTS

| CN | 1131767 A | 9/1996 |
| CN | 1287316 A | 3/2001 |
| CN | 1458598 A | 5/2002 |
| CN | 1558606 A | 2/2004 |

(Continued)

OTHER PUBLICATIONS

Fellows, D., et al., "DOCSIS (TM) Cable Modem Technology," IEEE Communications Magazine, IEEE Service Center, vol. 39, No. 3, pp. 202-209 (Mar. 1, 2001).

(Continued)

*Primary Examiner* — Thai D Hoang
(74) *Attorney, Agent, or Firm* — Finnegan, Henderson, Farabow, Garrett & Dunner LLP

(57) ABSTRACT

A method for initialization configuration of a managed device, includes: predefining and storing initial configuration information of the managed device; detecting a message requesting for IP address assignment broadcasted from the managed device; searching in the initial configuration information for the message requesting for IP address assignment, to obtain an IP address of a Device Management (DM) interface of the managed device; sending the IP address to the managed device; upon determining that the managed device has configured its IP address as the IP address, sending an initial configuration command to the managed device; and performing automatically the initialization configuration of the managed device in accordance with the initial configuration information. A system for initialization configuration of a managed device is also provided.

12 Claims, 3 Drawing Sheets

FOREIGN PATENT DOCUMENTS

| | | | |
|---|---|---|---|
| CN | 1614937 A | 5/2005 |
| CN | 100484023 C | 4/2009 |
| EP | 1 557 977 A | 7/2005 |
| WO | 02/15490 A | 2/2002 |

OTHER PUBLICATIONS

First Chinese Office Action dated (mailed) Dec. 28, 2007, issued in related Chinese Application No. 200510087292.8, Huawei Technologies Co., Inc.

Second Chinese Office Action dated (mailed) Aug. 29, 2008, issued in related Chinese Application No. 200510087292.8, Huawei Technologies Co., Inc.

First Chinese Office Action dated (mailed) Sep. 19, 2008, issued in related Chinese Application No. 200680013145.9, Huawei Technologies Co., Inc.

Written Opinion of the International Searching Authority (translation) dated (mailed) Oct. 19, 2006, issued in related Application No. PCT/CN2006/001295, Huawei Technologies Co., Ltd.

R. Droms, Bucknell University, "Dynamic Host Configuration Protocol", Standards Track, RFC 2131.txt, Mar. 1997, 41 pgs.

* cited by examiner

METHOD AND SYSTEM FOR INITIALIZATION CONFIGURATION OF MANAGED DEVICE

CROSS-REFERENCE TO RELATED APPLICATIONS

The present application is a continuation application of PCT application No. PCT/CN2006/001295, filed Jun. 13, 2006, which claims the Chinese priority No. 200510087292.8, filed Jul. 28, 2005.

FIELD OF THE INVENTION

The present invention relates to the network management technology field, and more particularly to a method and a system for initialization configuration of a managed device.

BACKGROUND OF THE INVENTION

As network applications and scales are increasing, the network management workload becomes heavier and heavier. The ITU-T (International Telecommunications Union—Telecommunication Standardization Sector) TMN (Telecommunication Management Network) model defines four levels of network management that is a Network Element Layer, a Network Management Layer, a Service Management Layer and a Business Management Layer. Each of the layers is functionally divided into five major modules, i.e., a fault management module, a configuration management module, an accounting management module, a performance management module and a security management module. A network management system (NMS) is typically intended to meet demands of a specific level, e.g., the Network Element Layer or the Service Management Layer.

From the perspective of a general architecture, the network management system typically includes three major parts, i.e., a management station, a managed device and an agent. Particularly, the management station is a workstation or PC server running the network management system. The managed device refers to any device located within the management scope of the management station, and in a data communication network, generally includes a router, a switch, a firewall, etc. The agent is a channel for management information interaction between the management station and the managed device, and is generally a service program running on the managed device. In the data communication network, management interfaces between the management station and the managed device primarily include an SNMP (Simple Network Management Protocol) interface and a CLI (Command Line Interface) interface. The SNMP is available in three versions of V2, V2C and V3.

Generally, a life cycle of network management includes three phases, i.e., device initialization phase, management phase and supervisory control phase. The device initialization phase mainly involves a configuration of an IP address of a device management interface and some other fundamental configurations, which get prepared for putting the network management system into use. The management and supervisory control phases mainly involve a use of the NMS for the device management with respect to configuration, failure, performance, log, security, etc.

The existing NMS system mainly focuses on the management and supervisory control phases during the life cycle of the network management, and the device initialization phase during the life cycle of the network management is typically accomplished manually.

A method for initial configuration of a device in the device initialization phase in the prior art will be described here. Skilled personnel are dispatched to the installation site of the device, and the powered-on device is connected via a serial port or a local terminal sequentially. In accordance with a configuration manual and a network management plan, configuration of an IP address of a device management interface and a subnet mask as well as other initial configurations, including those of an IP address(es) of other interface(s), an SNMP version number, an SNMP community name, an SNMP Trap server, a Syslog (a System log) receiving host, etc., are performed manually through command lines. Then, the device that has been initially configured is added to the NMS, and managements as to configuration, failure, performance, log, security and the like are performed on the device.

In the above method for initial configuration of a device in the prior art:

1. The skilled personnel have to go to the installation site to perform the device initialization configuration manually. In the case of a huge number of managed devices, especially in the case that the devices are dispersed at different locations, such simple repetitive manual initialization configuration work for the devices may consume significant labor cost and require high maintenance cost.

2. The network management system can be put into use only after the device has been initialized, and this method separates the network planning from the network management, resulting in an insufficient planning capability of the network management system.

SUMMARY OF THE INVENTION

In view of the above disadvantages in the prior art, embodiments of the present invention provide a method and a system for initialization configuration of a managed device in order to accomplish automatically the configuration of the managed device in an initialization phase, and thereby to reduce operation and maintenance costs for operators and equipment suppliers.

The object of the present invention can be attained with the following technical solutions.

A method for initialization configuration of a managed device may include:
predefining and storing initial configuration information of the managed device, and performing automatically the initialization configuration of the managed device in accordance with the initial configuration information.

Optionally, the initial configuration information may include:
a device serial number, a MAC address of a DM (Device Management) interface, an IP address of a DM interface, one or more IP addresses of one or more other interfaces, an SNMP (Simple Network Management Protocol) version number, an SNMP community name, configuration information of an SNMP Trap server, and information of a Syslog receiving host.

In particular, the method may include:
A. configuring automatically an IP address of an DM interface of the managed device in accordance with the saved initial configuration information;
B. performing automatically the initialization configuration of the managed device with the configured IP address of the DM interface of the managed device in accordance with the saved initial configuration information.

Optionally, the IP address may include an IPv4 or IPv6 address.

Optionally, the step A may include:

A1. broadcasting, by the managed device after being started, a message requesting for IP address assignment, with an MAC address or device serial number of the managed device being carried in the message;

A2. detecting the message requesting for IP address assignment broadcasted from the managed device, and determining from the message the MAC address or device serial number of the managed device;

A3. searching in the initial configuration information in accordance with the determined MAC address or device serial number, determining an IP address corresponding to the DM interface of the managed device, and using the IP address to configure the IP address of the DM interface of the managed device.

Optionally, the step B may include:

B1. sending a poll message to the IP address of the DM interface indicated in the initial configuration information, and upon receiving a response message returned from the managed device, going to step B2;

B2. in accordance with a device configuration policy indicated in the initial configuration information, issuing to the managed device an initial configuration command which is in turn used to perform the initialization configuration of the managed device.

Optionally, the step B2 may include:

issuing the initial configuration command to the managed device via a command line interface or SNMP interface.

A system for initialization configuration of a managed device may include:

a network management unit adapted to save initial configuration information of the managed device, to issue an initial configuration command to the managed device that has obtained an IP address, and to transmit device identification information and IP address information of a DM (Device Management) interface indicated in the initial configuration information to a serving unit for IP address assignment;

the serving unit for IP address assignment adapted to determine an IP address of a DM interface of the managed device in accordance with the information transmitted from the network management unit and a detected request message transmitted from the managed device, and to transmit the IP address to the managed device;

the managed device adapted to configure an IP address of the DM interface in accordance with the IP address transmitted from the serving unit for IP address assignment, and to perform the initialization configuration in accordance with the initial configuration command issued from the network management unit.

Optionally, the network management unit may include:

an initial configuration information saving module adapted to save the initial configuration information of the managed device in the network management unit, and to transmit the saved initial configuration information to an initial configuration information sending module and an configuration command sending module, where the initial configuration information saving module may be implemented by means of a policy configuration database;

the initial configuration information sending module adapted to transmit, to the serving unit for IP address assignment, information of a device serial number, the MAC address of the DM interface and the IP address of the DM interface indicated in the received initial configuration information;

the configuration command sending module adapted to send a poll message to the IP address of the DM interface indicated in the received initial configuration information, and upon receiving the response message returned from the managed device, to send an initial configuration command to the managed device in accordance with a device configuration policy indicated in the received initial configuration information.

Optionally, the network management unit may include:

an initial configuration information inputting module adapted in a network planning phase to input via an interface the initial configuration information of the managed device, and to transmit the inputted initial configuration information to the initial configuration information saving module;

an initial configuration information maintenance module adapted in the network planning phase to update the initial configuration information of the managed device saved in the initial configuration information saving module upon change of the initial configuration information.

Optionally, the serving unit for IP address assignment may include:

an initial configuration information receiving module adapted to receive the information of the device serial number, the MAC address of the DM interface and the IP address of the DM interface transmitted from the network management unit, and to transmit the received information to an IP address issuing module;

a detecting module adapted to detect the message requesting for IP address assignment address broadcasted from the managed device, to obtain from the message the MAC address or device serial number of the managed device, and to transmit the obtained MAC address or device serial number to the IP issuing module;

the IP address issuing module adapted to determine an IP address planned for the DM interface of the managed device in accordance with the information transmitted from the initial configuration information receiving module and the MAC address or device serial number transmitted from the detecting module, and to issue the IP address to the managed device.

Optionally, the managed device may include:

a request message sending module adapted to broadcast a message requesting for IP address assignment after the managed device is started, with the MAC address or device serial number of the managed device being carried in the message;

a DM interface IP address configuration module adapted to receive the IP address transmitted from the serving unit for IP address assignment, and to use the IP address to configure automatically the IP address of the DM interface of the managed device;

an initialization configuration module adapted to receive the poll message from the network management unit, to return a response message, to receive the configuration command transmitted from the network management unit, and to perform the initialization configuration of the managed device in accordance with the configuration command.

As can be seen from the above, the present invention can be advantageous over the prior art in the following aspects.

1. The configuration of the managed devices can be enabled automatically in the initialization phase, including assignment of an IP address and the like. To some extent, the initial configuration can be enabled upon addition of the managed device to the network, that is, in a plug-and-play way. Thus, the automation degree of the network management can be enhanced, and the operation and maintenance costs for operators and device providers can be reduced.

2. The initial configuration information of the managed device can be predefined in the policy configuration database, and hence the network management system (NMS) can be provided with the network planning capability. Thus, the integration of the network planning with the network management can extend the scope of the network management.

DETAILED DESCRIPTION OF THE EMBODIMENTS

Embodiments of the present invention provide a method and a system for initialization configuration of a managed device with the essence being that a device initialization phase is divided into a planning phase and an implementation phase, initial configuration information of the managed device is saved in advance in the planning phase, and initialization configuration is performed on the managed device in accordance with the saved initialization information of the managed device in the implementation phase.

Figure 1:
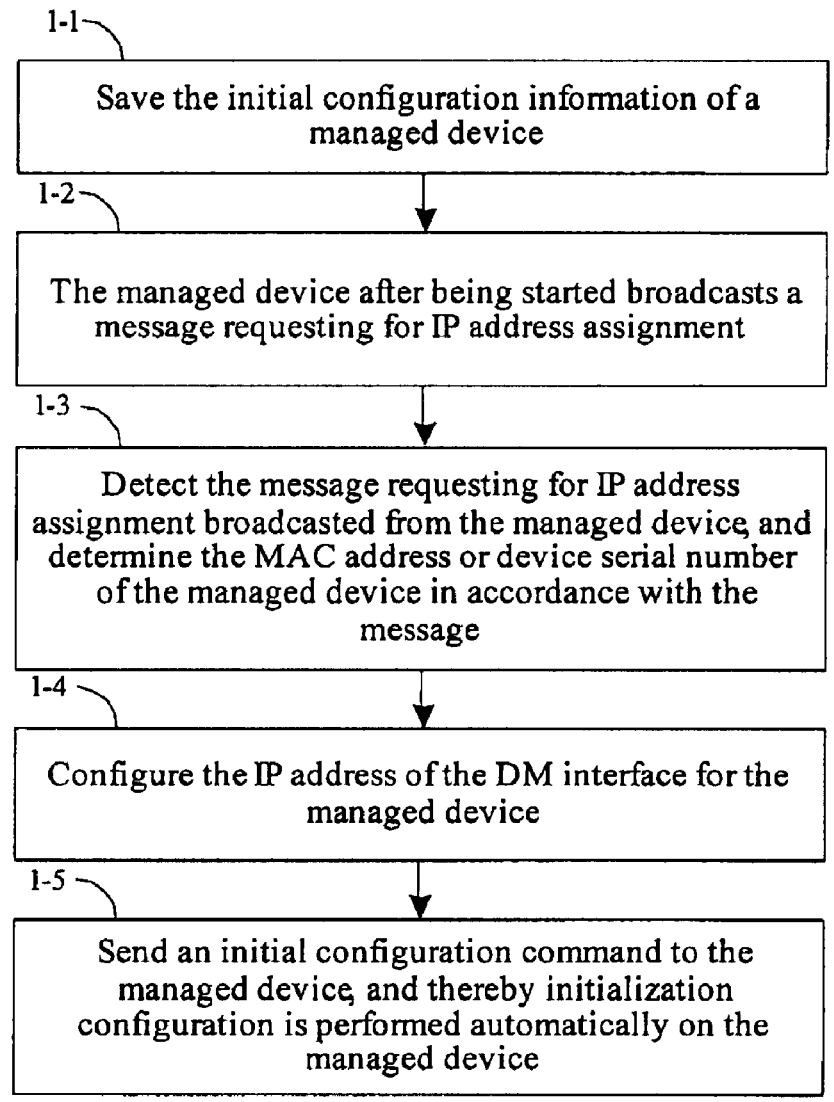
FIG. 1 is a flow diagram of a method for initialization configuration of a managed device according to an embodiment of the present invention.

A process of a method according to the present invention is shown in FIG. 1, including the following steps.

In step 1-1, initial configuration information of a managed device is saved.

According to the embodiment of the present invention, initial configuration information for a managed device in a network system is firstly predefined and saved in a planning phase. In a practical implementation, the initial configuration information can be saved in a database. The initial configuration information includes a device serial number, an MAC address of a device management (DM) interface, an IP address of a DM interface, an IP address(es) of other interface(s), an SNMP version number, an SNMP community name, configuration information of an SNMP Trap server, and information of a Syslog log receiving computer, etc.

In step 1-2, the managed device after being started broadcasts a message requesting for IP address assignment.

After being powered on and started, the managed device broadcasts a message requesting for assignment of an IP address to its DM interface, and this message contains device identification information, such as an MAC address or a device serial number, of the device. Then, the managed device waits for receipt of a response to this message.

In step 1-3, a serving unit for IP address assignment detects the message requesting for IP address assignment broadcasted from the managed device, and determines the MAC address or device serial number of the managed device in accordance with the message.

The message requesting for IP address assignment broadcasted from the managed device is detected through a network, and upon receipt of the message, the MAC address or device serial number of the device is obtained from the message. Then, the obtained MAC address or device serial number of the device is used as a keyword to search in an initialization address index table (will be described below) saved in the serving unit for IP address assignment, to obtain a corresponding IP address of the DM interface. Furthermore, a response to the message requesting for IP address assignment is broadcasted with the response containing the obtained IP address of the DM interface or otherwise relevant error information.

In step 1-4, an IP address of the DM interface is configured for the managed device.

The managed device receives the returned response to the message requesting for IP address assignment, and obtains from the response the IP address of the DM interface. Then, this IP address is used to configure an IP address of its DM interface automatically.

In step 1-5, a network management unit sends an initial configuration command to the managed device, and thereby initialization configuration is performed automatically on the managed device.

In the implementation phase, the network management unit sends a poll message to the IP address of the DM interface indicated in the initial configuration information. If the IP address of the DM interface has been configured for the managed device, then the managed device can return a corresponding response message; otherwise, for example, the polling for that IP address can be suspended for a period of time or a predefined interval of time, and then be restarted.

Upon receiving the response message returned from the managed device, the network management unit issues an initial configuration command to a corresponding managed device in accordance with a device configuration policy indicated in the initial configuration information, and then this command is used to perform the initialization configuration of the managed device automatically. Note that the initialization configuration here refers to any configuration required for normally operating the device except for an IP address of a DM interface. In this case, the system generates a configuration command in accordance with the device configuration policy and then issues, with invocation of a Telnet access interface function or the like, the command to a managed device for initialization configuration thereof.

Figure 2:
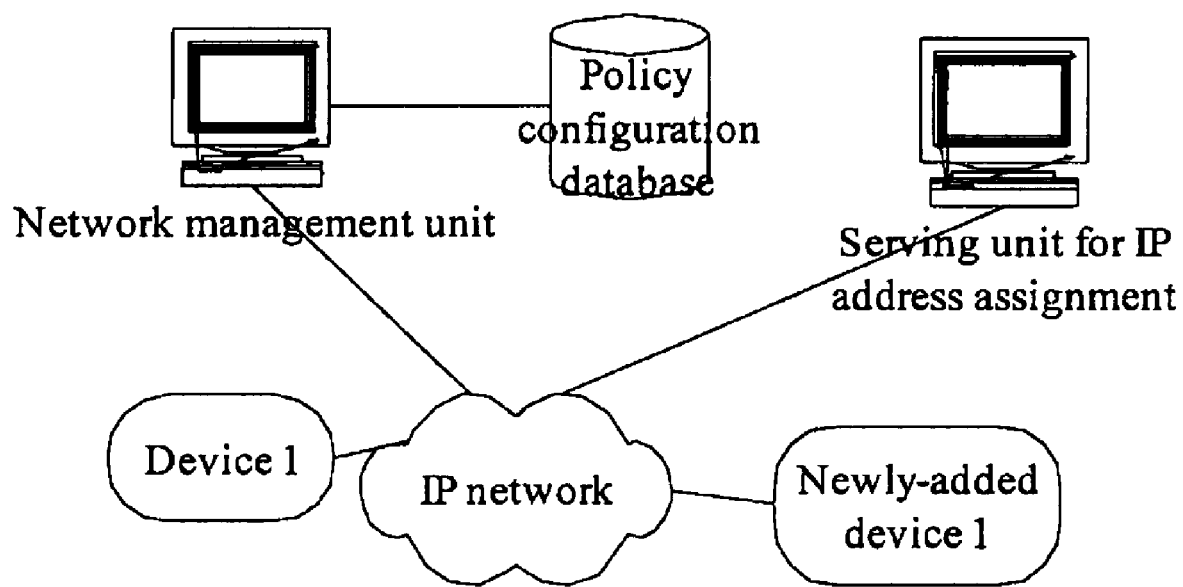
FIG. 2 is a schematic diagram of networking in connection with a system for initialization configuration of a managed device according to an embodiment of the present invention.
Figure 3:
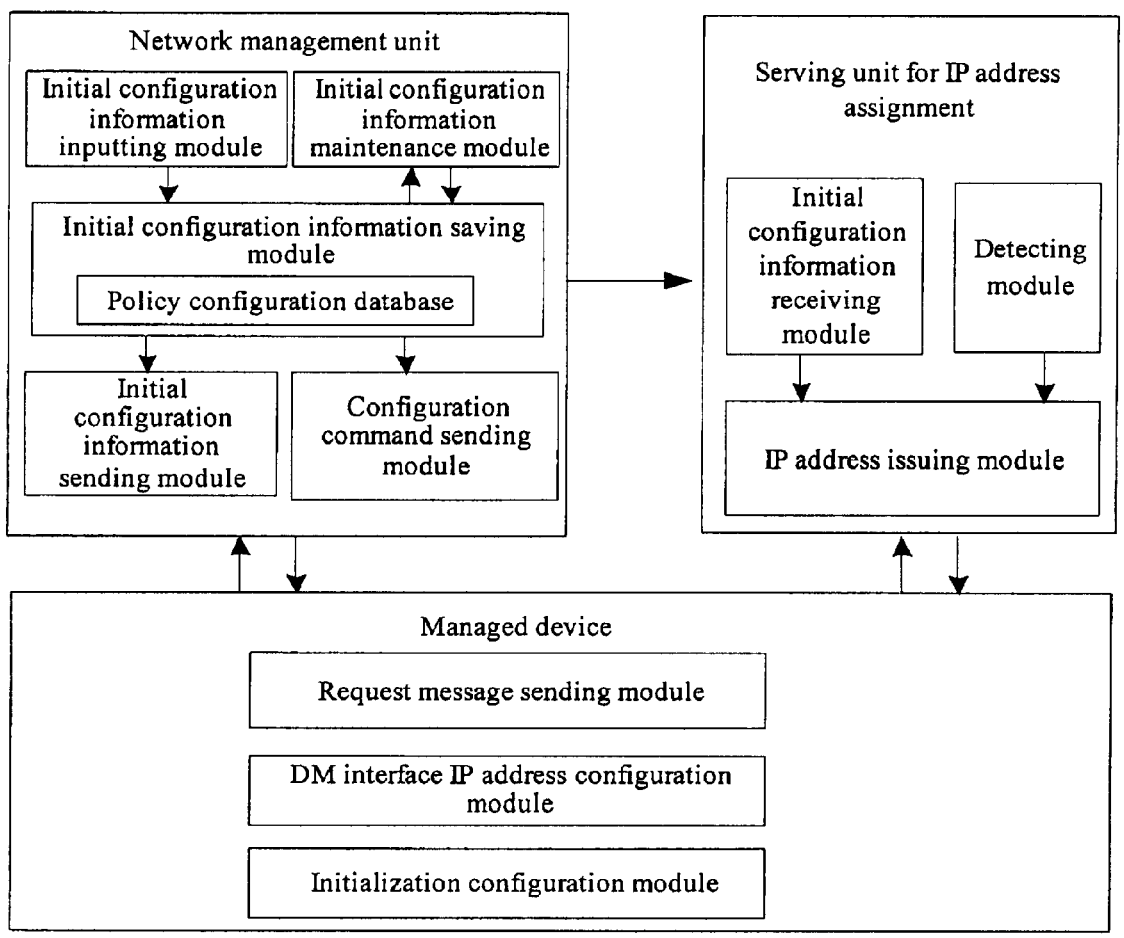
FIG. 3 is a structural diagram of the system for initialization configuration of the managed device according to the embodiment of the present invention.

A schematic diagram of networking a system according to an embodiment of the present invention is shown in FIG. 2, where the system mainly includes three parts, i.e., a network management unit, a serving unit for IP address assignment and a managed device. A specific structural diagram of the system is shown in FIG. 3, including the following modules.

Network Management Unit: In the network planning phase, the network management unit inputs, via a GUI, network planning data, i.e., initial configuration information, including a device serial number, a MAC (Media Access Control) address of a DM (Device management) interface, an IP address of an DM interface, an IP address(es) of other interface(s), an SNMP version number, an SNMP community name, configuration information of an SNMP Trap server, and information of a Syslog receiving host, etc., and the network management unit saves the inputted initial configuration information into an internal policy configuration database, and transmits the information of the device serial number, the IP address of the DM interface and the MAC address of the DM interface to the serving unit for IP address assignment. Further in the implementation phase, the network management unit is used to issue a configuration command via a CLI (Command Line Interface), the SNMP or any other interface in accordance with the saved planning data, and the initialization configuration is performed for any device that has obtained an IP address.

The management scope of the network management unit covers all devices in the IP network, including a router, a switch, a PC, and a fixed or mobile terminal, etc. Upon change of the planning data, the network management unit notifies the serving unit for IP address assignment of updated data.

The network management unit includes an initial configuration information inputting module, an initial configuration information maintenance module, an initial configuration information saving module, an initial configuration information sending module, and a configuration command sending module.

Particularly, in the network planning phase, the initial configuration information inputting module inputs via an interface the initial configuration information for the managed device, and passes the inputted initial configuration information to the initial configuration information saving module.

In the network planning phase, the initial configuration information maintenance module updates the initial configuration information saved in the initial configuration information saving module accordingly upon change of the initial configuration information of the managed device, such as the information of the device serial number of the managed device, an alarm server, a log server, etc.

The initial configuration information saving module saves the initial configuration information of the managed device in the network management unit, and passes the saved initial configuration information to the initial configuration information sending module and the configuration command sending module, and the initial configuration information saving module can be implemented by means of a policy configuration database.

The initial configuration information sending module sends to the serving unit for IP address assignment the device serial number, the MAC address of the DM interface and the IP address of the DM interface in the received initial configuration information.

The configuration command sending module sends a poll message to the IP address of the DM interface indicated in the initial configuration information, and upon receiving a response returned from the managed device, sends a configuration command to the managed device in accordance with the device configuration policy indicated in the received initial configuration information.

Note that an existing simple configuration policy can be a series of command scripts stored in a file system, which accomplish a certain function, where a command can be issued directly to a device, while a complex configuration policy can be (an) abstract configuration instruction(s) stored in a database, where the instruction(s) has (have) to be translated into an actual configuration command(s) prior to being issued to a device.

Serving Unit for IP Address Assignment: In the network planning phase, the serving unit for IP address assignment generates an initialization address index table in accordance with the information of the device serial number, the MAC address of the DM interface, the IP address of the DM interface and the like transmitted from the network management unit, searches in the initialization address index table for the IP address of the DM interface in accordance with the MAC address or device serial number of the device indicated in the detected message requesting for IP address assignment broadcasted from the managed device, and then notifies the managed device by sending a response message thereto. The serving unit for IP address assignment includes an initial configuration information receiving module, a detecting module and an IP address issuing module.

Particularly, the initial configuration information receiving module receives the information of the device serial number, the MAC address of the DM interface and the IP address of the DM interface transmitted from the network management unit, and transmits the received information to the IP address issuing module.

The detecting module detects the message requesting for IP address assignment address broadcasted from the managed device, obtains the MAC address or device serial number of the managed device from the messages, and transmits the obtained MAC address or device serial number to the IP address issuing module.

The IP address issuing module determines an IP address planned for the DM interface of the managed device in accordance with the information transmitted from the initial configuration information receiving module and the MAC address or device serial number transmitted from the detecting module, and issues this IP address to the managed device.

Dependent upon the network scale, the serving unit for IP address assignment can share the same physical server with the network management system, or can operate on another server separately, and dependent upon in accordance with the division of network broadcast domains, a plurality of serving units for IP address assignment can be deployed, or a proxy can be deployed at the border of the broadcast domains to relay IP address assignment requests from different domains.

Managed Device: In the network planning phase, the managed device after being powered and started broadcasts a message requesting for assignment of an IP address to the DM interface with the MAC address or device serial number of its managed device being carried in the message, and then configures the IP address for the DM interface in accordance with the IP address in the received response message. In the implementation phase, the managed device waits for receiving the initial configuration command issued from the network management unit, and automatically performs a corresponding initialization configuration process. The managed device includes a request message sending module, a DM interface IP address configuration module and an initialization configuration module.

Particularly, after the managed device is started, the request message sending module broadcasts a message requesting for IP address assignment with the MAC address or device serial number of the managed device being carried in the message.

The DM interface IP address configuration module receives the IP address transmitted from the serving unit for IP address assignment, and uses this IP address to automatically configure the IP address of the DM interface for the managed device.

The initialization configuration module receives a poll message transmitted from the network management unit and returns a response message, and also receives a configuration command transmitted from the network management unit and automatically performs the initialization configuration of the managed device in accordance with the configuration command.

In a network building phase, a crucial device(s) in the network shall first be configured automatically, centering on the network management system and the serving unit for IP assignment service, and when the accessibility of the network gets ensured, other managed devices can be added to the network.

While the present invention has been described and illustrated with reference to the embodiments and the drawings, it shall be recognized by those skilled in the art that those embodiments and drawings are merely illustrative and not restrictive, that the present invention shall be not limited thereto, and that various modifications and variations can be made in light of the descriptions and the drawings without departing from the spirit and scope of the present invention as defined by the accompanying claims.

What is claimed is:

1. A method for initialization configuration of a managed device, comprising:
   predefining and storing initial configuration information of the managed device;
   detecting a message requesting for IP address assignment broadcasted from the managed device;
   searching in the initial configuration information for the message requesting for IP address assignment, to obtain an IP address of a Device Management (DM) interface of the managed device;
   sending the IP address to the managed device;
   upon determining that the managed device has configured its IP address as the IP address, sending an initial configuration command to the managed device; and
   performing automatically the initialization configuration of the managed device in accordance with the initial configuration command;
   wherein the initial configuration information comprises:
   a device serial number, a MAC address of a DM (Device Management) interface, an IP address of a DM interface, one or more IP addresses of one or more other interfaces, a Simple Network Management Protocol (SNMP) version number, an SNMP community name, configuration information of an SNMP Trap server, and information of a Sysloq receiving host.

2. The method for initialization configuration of a managed device according to claim 1, wherein the IP address comprises an IPv4 or IPv6 address.

3. The method for initialization configuration of a managed device according to claim 2, wherein the process of searching in the initial configuration information for the message requesting for IP address assignment, to obtain an IP address of a Device Management (DM) interface of the managed device comprises:
   determining from the message requesting for IP address assignment the MAC address or device serial number of the managed device;
   searching in the initial configuration information in accordance with the determined MAC address or device serial number; and
   determining the IP address corresponding to the DM interface of the managed device.

4. The method for initialization configuration of a managed device according to claim 1, wherein the step of sending an initial configuration command to the managed device for initialization configuration comprises:
   in accordance with a device configuration policy indicated in the initial configuration information, issuing to the managed device an initial configuration command which is in turn used to perform the initialization configuration of the managed device.

5. The method for initialization configuration of a managed device according to claim 4, wherein the step of in accordance with a device configuration policy indicated in the initial configuration information, issuing to the managed device an initial configuration command which is in turn used to perform the initialization configuration of the managed device comprises:
   issuing the initial configuration command to the managed device via a command line interface or SNMP interface.

6. The method for initialization configuration of a managed device according to claim 1, further comprising:
   sending a poll message to the IP address of the Device Management interface.

7. A system for initialization configuration of a managed device, comprising:
   a network management unit configured to save initial configuration information of the managed device, to issue an initial configuration command to the managed device that has obtained an IP address, and to transmit device identification information and IP address information of a DM (Device Management) interface indicated in the initial configuration information to a serving unit for IP address assignment;
   the serving unit for IP address assignment configured to determine an IP address of a DM interface of the managed device in accordance with the information transmitted from the network management unit and a detected request message transmitted from the managed device, and to transmit the IP address to the managed device;
   the managed device configured to configure an IP address of the DM interface in accordance with the IP address transmitted from the serving unit for IP address assignment, and to perform the initialization configuration in accordance with the initial configuration command issued from the network management unit.

8. The system for initialization configuration of a managed device according to claim 7, wherein the network management unit comprises:
   an initial configuration information saving module configured to save the initial configuration information of the managed device in the network management unit, and to transmit the saved initial configuration information to an initial configuration information sending module and an configuration command sending module, where the initial configuration information saving module can be implemented by means of a policy configuration database;
   the initial configuration information sending module configured to transmit, to the serving unit for IP address assignment, information of a device serial number, the MAC address of the DM interface and the IP address of the DM interface indicated in the received initial configuration information;
   the configuration command sending module configured to send a poll message to the IP address of the DM interface indicated in the initial configuration information, and upon receiving the response message returned from the managed device, to send an initial configuration command to the managed device in accordance with a device configuration policy indicated in the received initial configuration information.

9. The system for initialization configuration of a managed device according to claim 8, wherein the network management unit comprises:
   an initial configuration information inputting module configured to input, in a network planning phase, via an interface the initial configuration information of the managed device, and to transmit the inputted initial configuration information to the initial configuration information saving module;
   an initial configuration information maintenance module configured to update, in the network planning phase, the initial configuration information of the managed device saved in the initial configuration information saving module upon change of the initial configuration information.

10. The system for initialization configuration of a managed device according to claim 7, wherein the serving unit for IP address assignment comprises:
    an initial configuration information receiving module configured to receive the information of the device serial number, the MAC address of the DM interface and the IP address of the DM interface transmitted from the network management unit, and to transmit the received information to an IP address issuing module;

a detecting module configured to detect the message requesting for IP address assignment address broadcasted from the managed device, to obtain from the message the MAC address or device serial number of the managed device, and to transmit the obtained MAC address or device serial number to the IP issuing module;

the IP address issuing module configured to determine an IP address planned for the DM interface of the managed device in accordance with the information transmitted from the initial configuration information receiving module and the MAC address or device serial number transmitted from the detecting module, and to issue the IP address to the managed device.

11. The system for initialization configuration of a managed device according to claim 10, wherein the managed device comprises:

a request message sending module configured to broadcast a message requesting for IP address assignment after the managed device is started, with the MAC address or device serial number of the managed device being carried in the message;

a DM interface IP address configuration module configured to receive the IP address transmitted from the serving unit for IP address assignment, and to use the IP address to configure automatically the IP address of the DM interface of the managed device;

an initialization configuration module configured to receive the poll message from the network management unit, to return a response message, to receive the configuration command transmitted from the network management unit, and to perform the initialization configuration of the managed device in accordance with the configuration command.

12. The system for initialization configuration of a managed device according to claim 7, wherein the initial configuration information saving module is further configured to send a poll message to the IP address of the Device Management interface, and to determine that the managed device has configured its IP address as the IP address of the Device Management interface upon receiving a corresponding response message from the managed device.

* * * * *